Nov. 24, 1936.   J. PENTKA   2,061,978
ELECTRICALLY OPERATED LOCK FOR MOTOR VEHICLES
Filed May 22, 1935   3 Sheets-Sheet 1
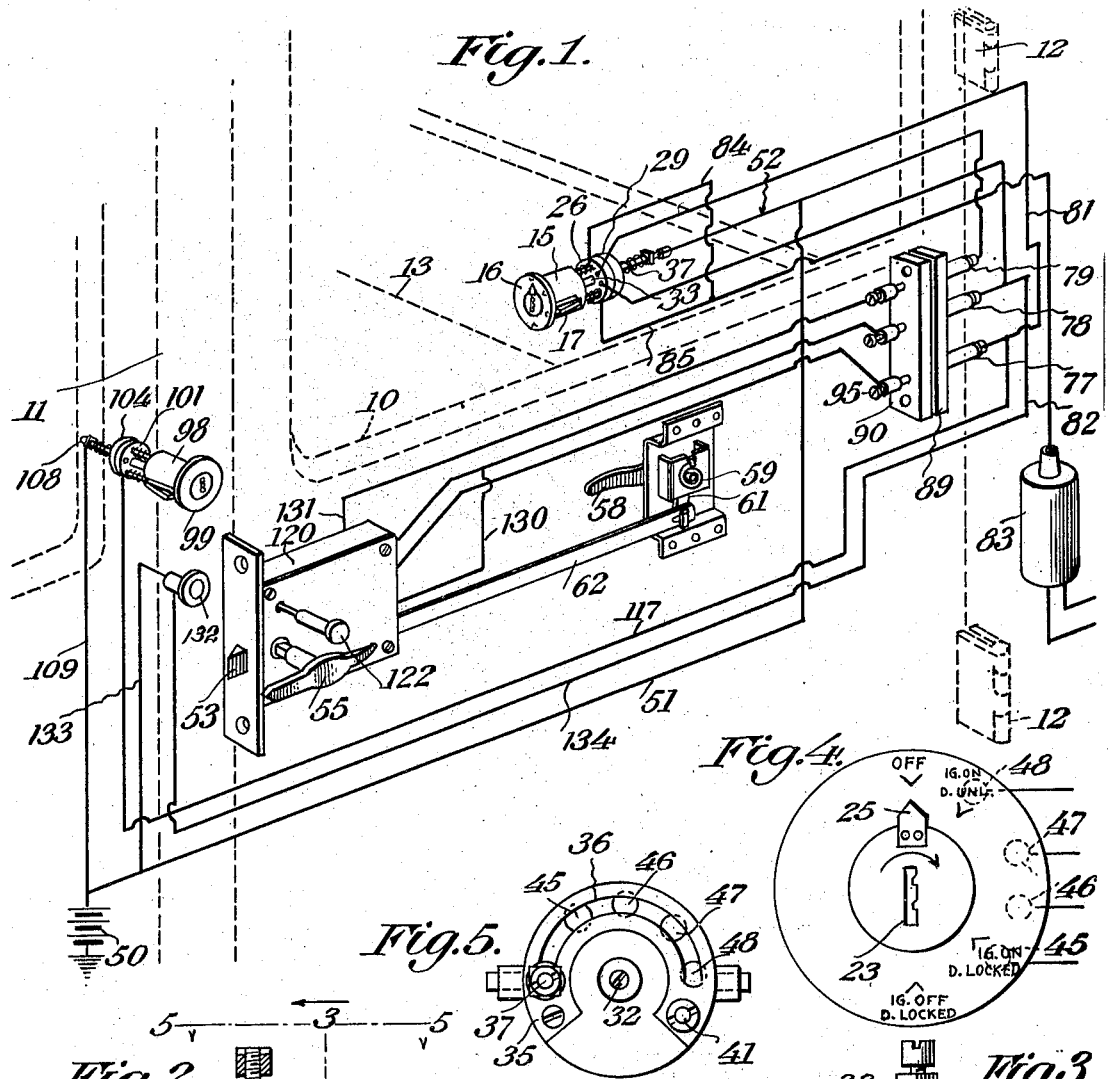
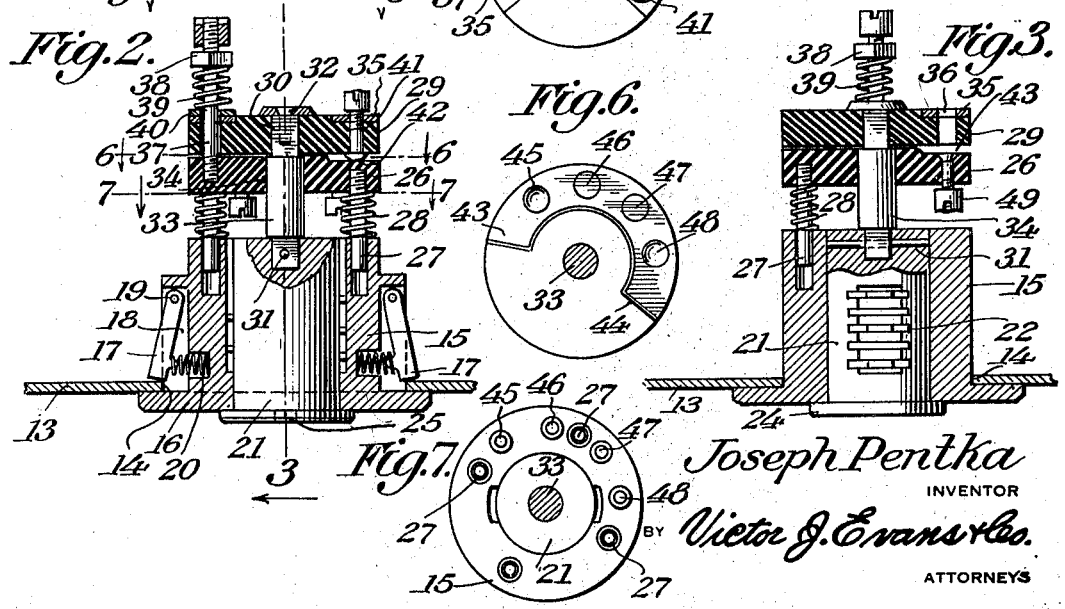
Joseph Pentka
INVENTOR
BY Victor J. Evans & Co.
ATTORNEYS Nov. 24, 1936.  J. PENTKA  2,061,978
ELECTRICALLY OPERATED LOCK FOR MOTOR VEHICLES
Filed May 22, 1935  3 Sheets-Sheet 2
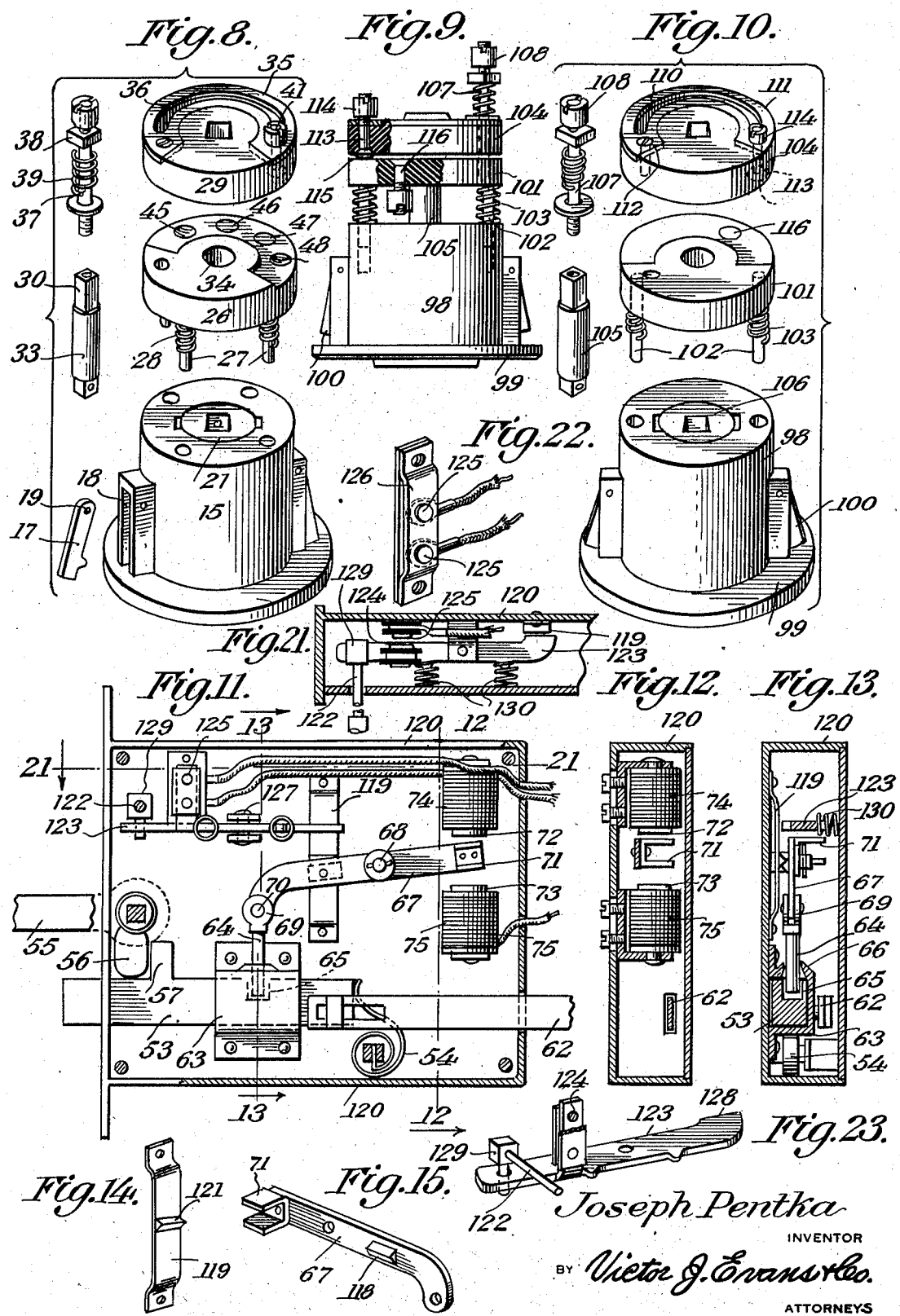
Joseph Pentka
INVENTOR
BY Victor J. Evans & Co.
ATTORNEYS Nov. 24, 1936.  J. PENTKA  2,061,978
ELECTRICALLY OPERATED LOCK FOR MOTOR VEHICLES
Filed May 22, 1935  3 Sheets-Sheet 3
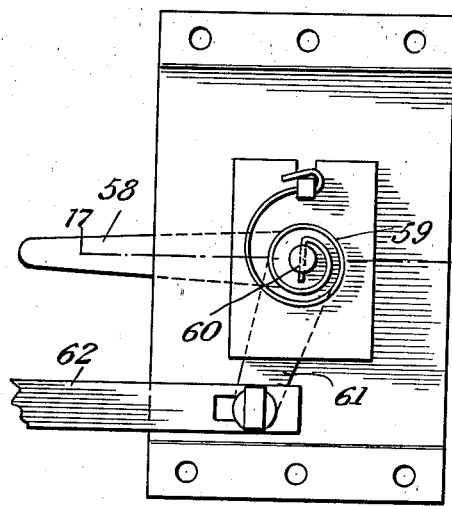
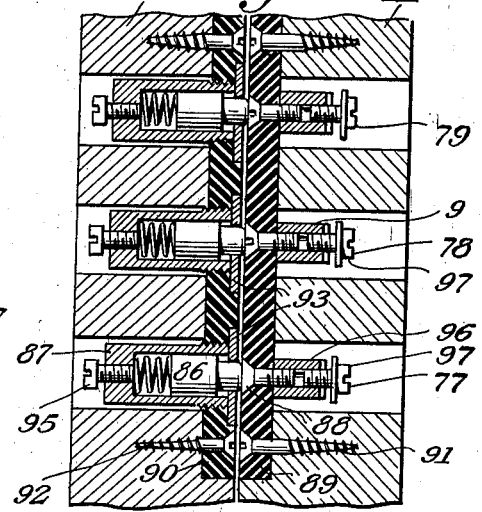
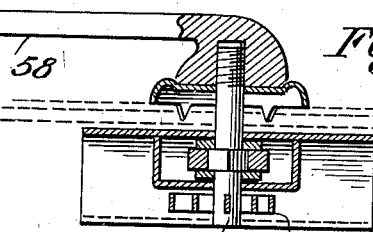
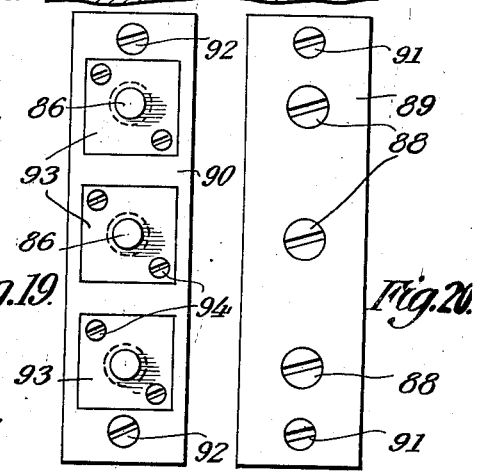
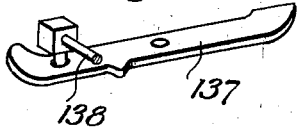
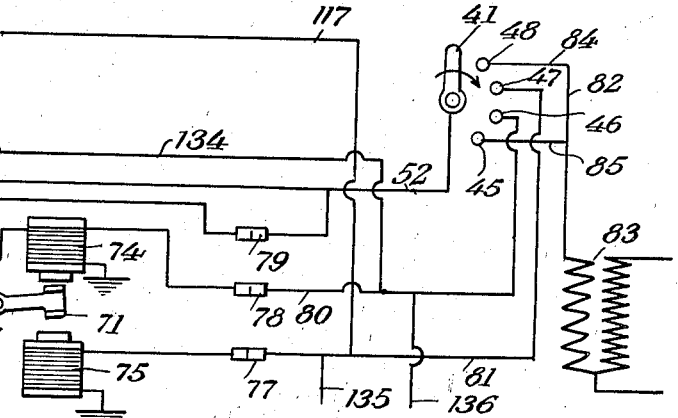
Joseph Pentka
INVENTOR
BY Victor J. Evans & Co.
ATTORNEYS Patented Nov. 24, 1936

2,061,978

UNITED STATES PATENT OFFICE 2,061,978

ELECTRICALLY OPERATED LOCK FOR MOTOR VEHICLES

Joseph Pentka, Dickson City, Pa.

Application May 22, 1935, Serial No. 22,849

1 Claim. (Cl. 70—127)

This invention relates to electrically operated locks for motor vehicles and has for an object to provide novel means for controlling the ignition and the door locks simultaneously by means of the ignition key.

A further object is to provide novel means whereby the driver may lock or unlock the doors while the ignition is on or off by simply turning the ignition key until a pointer on the switch barrel points to a legend on the switch housing designating the desired combination.

A further object is to provide novel means for locking and unlocking the doors from outside of the motor vehicle independently of the ignition switch.

A further object is to provide novel means for unlocking the doors in case of an emergency such as a weak battery.

A still further object is to provide apparatus of this character which will be substantially proof against tampering and will be formed of a few simple strong and durable parts which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a perspective view of the apparatus and also shows the electric wiring diagram.

Figure 2 is a longitudinal sectional view of the combined ignition and lock controlling switch.

Figure 3 is a longitudinal sectional view taken on the line 3—3 of Figure 2.

Figure 4 is a front elevation of the switch showing the inscribed dial and pointer.

Figure 5 is a rear elevation of the switch.

Figure 6 is a cross sectional view taken on the line 6—6 of Figure 2.

Figure 7 is a cross sectional view taken on the line 7—7 of Figure 2.

Figure 8 is a perspective view of the switch showing the parts disassembled.

Figure 9 is a side elevation of the unlocking key operated switch for operation independently of the ignition and from outside of the vehicle.

Figure 10 is a perspective view of the switch shown in Figure 9, with the parts disassembled.

Figure 11 is a side elevation of the door lock.

Figure 12 is a cross sectional view taken on the line 12—12 of Figure 11.

Figure 13 is a cross sectional view taken on the line 13—13 of Figure 11.

Figure 14 is a detail perspective view of the spring catch.

Figure 15 is a detail perspective view of the electrically controlled latch pin lever.

Figure 16 is a side elevation of the manual remote control of the lock.

Figure 17 is a cross section taken on the line 17—17 of Figure 16.

Figure 18 is a longitudinal sectional view showing the connecter for carrying the conductor wires from the car body into the doors.

Figure 19 is a front elevation of one of the connecters.

Figure 20 is a front elevation of the other connecter.

Figure 21 is a longitudinal sectional view taken on the line 21—21 of Figure 11 showing the push rod switch of the door lock.

Figure 22 is a detail perspective view of one of the contacts of the push rod operated switch.

Figure 23 is a detail perspective view of the push rod switch lever and contact carried thereby.

Figure 24 is a detail perspective view of a similar lever for dislodging the spring catch to permit unlocking of the door lock.

Figure 25 is a diagrammatic view showing the electric circuits of the apparatus.

Referring now to the drawings in which like characters of reference designate similar parts in the various views, 10 designates the door, 11 the body, and 12 the door hinges of an automobile or truck. The dash 13 is provided with an opening 14 as shown in Figure 2 to receive the housing 15 of the combined ignition and door lock controlling switch forming part of this invention. The housing is provided with a flange 16 which bears against the front face of the dash, and is also provided with a pair of oppositely disposed fingers 17 which are pivotally mounted in longitudinal recesses 18 formed in the housing as shown at 19, and are pressed outwardly by springs 20 to wedge against the rear face of the dash and coact with the flange in securing the housing to the dash.

A barrel 21 is rotatably mounted in the housing and is provided with the usual tumblers 22 which permit rotation of the barrel when the ignition key, not shown, is inserted through the key hole 23. The barrel is provided with a retaining flange 24 which bears against the front face of the housing and the flange is equipped with a pointer 25, best shown in Figure 4, which is located above the key hole. The face of the housing flange 16 is inscribed with legends designating obtainable combinations of the on and off positions of the ignition and the locked and the unlocked position of the door locks as will presently be fully explained.

A fiber disc 26 is nonrotatably secured to the inner face of the housing by means of pins 27 which are provided with springs 28 that space the disc from the housing and press the disc outwardly into tight contact with a similar disc 29 carried by and rotating integrally as a unit with the barrel 21.

The disc 29 is provided axially with a shaft 30 which is non-rotatably secured to the barrel by means of a pin 31. A screw 32 is threaded into the shaft and coacts with the above referred to flange 24 of the barrel in assembling the parts. The shaft is provided with an enlarged cylindrical portion 33 which is rotatably fitted in an axial opening 34 formed in the stationary disc 26.

An arcuate contact plate 35 best shown in Figure 5 is countersunk in the outer face of the disc 29 and the plate is provided with a slot 36 through which a terminal post 37 is loosely fitted and threaded into the stationary disc 26. The post is provided with a head 38 which confines a spring 39 against a washer 40 on the post and forces the washer into tight electrical contact with the plate 35. A distributor post 41 is passed through the plate 35 and disc 29 and below the disc is provided with a rounded head 42.

The stationary disc 26 is provided with an arcuate cut-out portion 43 to receive the head 42 and to present shoulders 44 which engage the head and limit rotary movement of the barrel in either direction to approximately 190°. Preferably four switch contacts 45, 46, 47 and 48 are arranged in the disc 26 and are provided with screw heads 49 best shown in Figure 3 for attaching conductor wires. As best shown in Figure 1 the stationary post 37 receives the current from the battery 50 through conductor wires 51 and 52 and passes it on to the plate 35 and post 41 to be distributed selectively to the switch contacts 45 to 48 inclusive to the ignition and door locks by turning the barrel with the ignition key in the direction shown by the arrow head in Figure 4.

In Figure 11 the master door lock is shown having a bolt 53 spring pressed forwardly by a coil spring 54 to engaged or locked position, the usual door handle 55 having a rollback 56 which engages a lug 57 on the bolt to withdraw the bolt to unlocked position and permit opening of the door. This same operation is also accomplished from within the vehicle at a point usually underneath the window, by means of a handle 58 best shown in Figure 1 which is maintained in released position by a coil spring 59 best shown in Figure 16, which surrounds the crank shaft 60, the crank 61 of which is connected to a link 62 that is connected to the bolt 53.

To lock the bolt 53 against withdrawal through the guide 63 a latch pin 64 is slidably mounted in an opening in the guide and extends into a notch 65 formed in the edge of the bolt, the edges of the opening being directed outwardly or flared to provide a guide 66 to hold the latch pin and guide it during movement into and out of the notch 65. A lever 67 is pivoted on a horizontal pivot pin 68 and is provided at one end with an offset which is passed between hinge eyes 69 on the latch pin and a pivot 70 connects the lever to the eyes. The free end of the lever is provided with a substantially U shaped armature 71, best shown in Figure 15, which extends laterally from the lever and is interposed between the cores 72 and 73 of electromagnets 74 and 75 which will hereinafter be referred to respectively as the locking magnet and the unlocking magnet. When the upper or locking magnet is energized the armature of the lever will be attracted and the lever will be rocked to depress the pin 64 to enter the notch 65 and prevent withdrawal of the bolt to open the doors by turning the handles 55 or 58. When the unlocking magnet 75 is energized the armature of the lever will be depressed and the latch pin will be withdrawn from the notch 65 and held clear of the notch so that the bolt 53 may be moved by either of the controlling handles to open the door.

For conducting the conductor wires from the car body through the hinged edge of the door and to the lock and the switch, preferably three connecters 77, 78, and 79 are employed. By referring to Figure 25 it will be seen that the locking magnet 74 is connected by a wire 80 to the switch contact 46 this conductor passing through the connecter 78. The unlocking magnet 75 is connected by a conductor wire 81 to the switch contact 47 this wire passing through the connecter 77. A conductor wire 82 is connected at one end to the ignition coil 83 and at the opposite end is provided with branches 84 and 85 which are connected to the contacts 45 and 48. Thus the two outer contacts 45 and 48 are connected to the ignition and the two inner contacts 46 and 47 are connected to the locking and unlocking electromagnets. It can now be seen that when the barrel of the ignition switch is turned clockwise by the key the distributor post 41 will engage with the contact 48 in which position the ignition is on and the door unlocked. If however the barrel is turned until the distributor post 41 engages the ignition contact 45 it will have wiped over the contact 46 which operates the locking magnet to lock the bolt so that in this position of the parts the door will be locked while the ignition is on. Again if from this last position, that is the post 41 in engagement with the contact 45, the barrel be turned counter-clockwise until the post engages with the contact 46 the locking magnet 74 will be energized to lock the door while at the same time the ignition will be off. Continuing the movement in a counter-clockwise direction until the arm passes from the contact 46 to the contact 47 it will be seen that the unlocking magnet 75 will be energized and the door unlocked while the ignition is still off. Thus it is clear that selective combinations of locked and unlocked positions of the door lock in synchronism with on or off positions of the ignition, are obtainable by manipulation of the ignition key.

By referring to Figure 6 it will be seen that the ignition contacts 45 and 48 are concave while the magnet contacts 46 and 47 have straight contact faces. The rounded head 42 of the distributor post 41 thus will drop into and come to rest in the concave contacts while it will merely have wiping contact with the contacts 46 and 47 as described above.

In Figure 18 the construction of the connecters is shown in detail. The connecters each comprise a spring pressed plunger 86 confined in a housing 87 carried by the door, the plunger bearing against a screw contact 88 carried by the body 11 of the vehicle. A face plate 89 of insulating material is countersunk in the body and mounts the screw contacts 88 while a similar plate 90 of insulating material is countersunk in the edge of the door and mounts the housings of the connecters. The plates are secured in position by suitable wood screws 91 and 92. A cover plate 93 for each plunger housing is secured to the insulating strip by screws 94. The housing is provided with a screw 95 to receive the conductor wire while the mating screw contact 88 is provided with a hub 96 which receives a screw 97 to attach the conductor wire.

For unlocking the door of the vehicle from the exterior of the vehicle an unlocking key operated switch is provided. The switch is similar in construction to the ignition switch with the exception that there is only one contact for the distributor post to engage and operate the unlocking magnet. As best shown in Figures 9 and 10 the housing 98 of the switch is provided with a flange 99 and opposed spring pressed fingers 100 to secure the housing to the door jamb or other part of the door or body. A stationary disc 101 of insulating material is secured to the housing by pins 102. Springs 103 surround the pins and force the disc outwardly from the housing to make tight contact with a rotary disc 104 of insulating material carried by a shaft 105 which is rigidly secured at one end to the barrel 106 of the switch.

A pin 107 is threaded into the stationary disc 101 and is provided with a nut 108 for attaching the conductor wire 109 leading from the battery 50. The pin passes through a slot 110 formed in an arcuate plate 111 which is secured in a countersink in the outer face of the disc by means of a screw 112. The plate conducts the current from the pin to a distributing post 113 which is secured at one end of the slot 110 by means of a nut 114, the opposite end of the post having a rounded head 115 adapted to have wiping contact with a switch contact 116 carried by the stationary disc 101. This switch contact is connected by a conductor wire 117 to the unlocking magnet 75 as shown in Figures 1 and 25. It is now clear that when the key is inserted in the barrel and the barrel rotated to bring the distributor post 113 into contact with the switch contact 116 the current will flow from the battery through the wire 109, distributor post 113, switch contact 116, and wire 117 through the connecter 77 and energize the unlocking magnet 75 to pull the lever 67 downwardly and withdraw the latch pin from the bolt. Thereupon the bolt may be operated by the handle in the usual manner to afford access to the vehicle.

By referring to Figures 14 and 15 it will be seen that the magnet operated lever 67 is provided with a triangular shaped tooth 118. A leaf spring 119 is secured to the side of the lock casing 120 as best shown in Figure 11. The spring is provided centrally with a triangular shaped tooth 121. The purpose of the teeth 118 and 121 is to yieldably hold the lever 67 at either limit of its movement. For instance when the lever has been attracted by the locking magnet 74 the tooth 118 will ride over the tooth 121 of the spring and lodge behind the tooth so that the lever is held raised as illustrated after the magnet becomes deenergized. Conversely when the lever is attracted by the unlocking magnet 75 the tooth 118 will lodge below the tooth 121 on the spring and hold the latch pin 64 released from the bolt 53 after the magnet 75 becomes deenergized. Thus operation of the lock is effected with minimum drain on the battery.

For locking the door from the exterior of the car independently of the ignition switch, I provide a push rod 122 best shown in Figures 21 and 23. The push rod enters the outer side of the lock housing 120 and is pivotally connected to a lever 123 which carries an upstanding switch contact 124 which confronts and is adapted to bridge a stationary switch contact 125 carried by an insulating bracket 126 on the housing 120 as best shown in Figure 22. The lever is mounted on a vertical pivot 127 and the free end 128 of the lever overlaps the leaf spring 119 for a purpose which will be presently explained. The push rod 122 is connected to the lever by means of a pivot pin 129 which may swivel on the lever. A pair of helical springs 130 are confined between the lever and the wall of the housing and normally hold the lever in position to maintain the switch contacts 124 and 125 spaced apart. One of the switch contacts 125 is connected by a conductor wire 130 to the locking magnet 74 while the other contact is connected by a wire 131 to the feed wire 51 from the battery, this wire 131 passing through the uppermost connecter 79 as best shown in Figure 25.

When the vehicle is to be locked from the outside it is simply necessary to push the push rod 122 until the switch contacts 124 and 125 are closed whereupon current will flow from the battery through the wire 51, wire 131, switch contacts 125 and 124 and wire 130 to the locking magnet 74. The magnet lifts the lever 67 to insert the latch pin in the notch in the bolt. As above described tooth 118 rides over and lodges above the tooth 121 on the leaf spring so that upon release of the push button the lever will be held at this upper limit of movement when the magnet becomes deenergized.

In the event of a battery so run down or weak as to be incapable of energizing the unlocking magnet 75 sufficiently to pull down lever 67 against the friction of the teeth 118 and 121, the push rod 122 is pulled outwardly. This moves the end 128 of the lever 123 to engage and depress the leaf spring 119 so that the teeth are dislodged and the lever 67 is actually free to fall of its own weight if this were possible. However the key operated unlocking switch must be employed to direct current through the unlocking magnet 75 before the lever 67 will be attracted to withdraw the latch pin from the locking bolt. Even a very slight current will energize the magnet sufficient to perform its function once the teeth 118 and 121 have been dislodged.

An additional switch, preferably of the button type is employed to lock the door independently of the push rod. This push button switch is indicated in general by the numeral 132 and while it is shown as being located on the door jamb in Figure 1 it may be located at any desirable part of the car. The push button is connected to the feed wire 51 by a wire 133 and is connected to the locking magnet 74 by a wire 134. When the button is pushed current will flow from the battery through the wire 51 wire 133 button 132 wire 134 to the locking magnet 74 to move the latch pin into the notch in the bolt 53.

It will be observed that all of the doors of a vehicle may be equipped with magnets controlling a latch pin as above described and that the lock of one of the doors, for instance one of the front doors, may be used as a master lock and the wires 80 and 81 connected by wires 135 and 136, shown in Figure 25, to the other locks for operating either the locking magnet 74 or the unlocking magnet 75 in synchronism throughout all the doors when either the ignition switch is in operation or the key operated unlocking switch or the push rod operated switch, is in operation.

It is not necessary to equip any other lock except the master lock with the push rod operated switch above described since it will be obvious that a single lever 137 best shown in Figure 24 may be mounted in each lock other than the master lock to depress the spring 119 and free the lever 67 as above described. If the key has been inserted in the key operated switch and this switch turned prior to operating the push rod 138 of the lever 137, the unlocking magnet will be energized to attract the lever 67 and withdraw the latch pin as above described.

From the above description it is thought that the construction and operation of my invention will be fully understood without further explanation.

What is claimed is:

A selective control for motor vehicles comprising an ignition device, an electrically operated door lock, conductors electrically connected to the ignition device and the lock, an ignition switch controlling flow of current through the conductors and comprising a rotary barrel and a housing, juxtaposed discs of insulating material carried by the barrel and housing respectively, and a plurality of switch contacts carried by the discs effecting selective combinations of locked and unlocked positions of the door lock when the ignition is on and locked position of the lock during off position of the ignition device.

JOSEPH PENTKA.